(12) United States Patent
Weh et al.

(10) Patent No.: US 12,703,334 B2
(45) Date of Patent: Aug. 11, 2026

(54) ELECTROHYDRAULIC POWER BRAKING SYSTEM

(71) Applicant: Robert Bosch GmbH, Stuttgart (DE)

(72) Inventors: Andreas Weh, Sulzberg (DE); Martin Hagspiel, Rettenberg (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 399 days.

(21) Appl. No.: 18/551,259

(22) PCT Filed: Sep. 22, 2022

(86) PCT No.: PCT/EP2022/076330
§ 371 (c)(1),
(2) Date: Sep. 19, 2023

(87) PCT Pub. No.: WO2023/066587
PCT Pub. Date: Apr. 27, 2023

(65) Prior Publication Data

US 2024/0166180 A1 May 23, 2024

(30) Foreign Application Priority Data

Oct. 21, 2021 (DE) ..................... 10 2021 211 886.0

(51) Int. Cl.
*B60T 13/68* (2006.01)
*B60T 8/175* (2006.01)
(Continued)

(52) U.S. Cl.
CPC ............ *B60T 8/1755* (2013.01); *B60T 8/175* (2013.01); *B60T 2270/402* (2013.01); *B60T 2270/413* (2013.01); *B60T 2270/414* (2013.01)

(58) Field of Classification Search
CPC ...... B60T 8/175; B60T 8/1755; B60T 8/4081; B60T 13/686; B60T 2270/402; B60T 2270/413; B60T 2270/414
See application file for complete search history.

(56) References Cited

U.S. PATENT DOCUMENTS 9,205,821 B2 * 12/2015 Biller .................... B60T 13/686
10,752,228 B2 * 8/2020 Peichl .................. B60T 8/4081
(Continued)

FOREIGN PATENT DOCUMENTS

DE 102012205860 A1 10/2012
DE 102014213732 A1 1/2016
(Continued)

OTHER PUBLICATIONS

International Search Report for PCT/EP2022/076330, Issued Jan. 11, 2023.

*Primary Examiner* — Thomas W Irvin
(74) *Attorney, Agent, or Firm* — NORTON ROSE FULBRIGHT US LLP

(57) ABSTRACT

In the field of autonomous driving, a power braking system having two piston-cylinder units, one of which electromechanically generates a hydraulic brake pressure by means of an electric motor and the other of which communicates with the former in such a way that under pressure it generates a brake pressure in a second brake circuit. The second piston-cylinder unit hydraulically separates two brake circuits from each other.

10 Claims, 2 Drawing Sheets

(51) Int. Cl.
*B60T 8/1755* (2006.01)
*B60T 8/40* (2006.01)

(56) References Cited

U.S. PATENT DOCUMENTS

| | | | | |
|---|---|---|---|---|
| 10,919,512 | B2 * | 2/2021 | Foitzik | B60T 17/18 |
| 10,988,124 | B2 * | 4/2021 | Besier | B60T 7/042 |
| 11,648,924 | B2 * | 5/2023 | Maj | B60T 8/326 303/6.01 |
| 2011/0115282 | A1 | 5/2011 | Dinkel et al. | |
| 2014/0028084 | A1 * | 1/2014 | Biller | B60T 13/686 303/9.62 |
| 2015/0035353 | A1 | 2/2015 | Drumm | |
| 2019/0031165 | A1 * | 1/2019 | Besier | B60T 8/348 |
| 2019/0241167 | A1 * | 8/2019 | Peichl | B60T 13/165 |
| 2019/0308601 | A1 * | 10/2019 | Maj | B60T 13/161 |
| 2020/0369246 | A1 * | 11/2020 | Brand | B60T 13/745 |
| 2025/0145136 | A1 * | 5/2025 | Weh | B60T 8/345 |

FOREIGN PATENT DOCUMENTS

| | | | |
|---|---|---|---|
| DE | 102019207685 | A1 | 11/2020 |
| DE | 102019219483 | A1 | 6/2021 |
| DE | 102020202048 | A1 | 8/2021 |
| EP | 1970271 | A1 | 9/2008 |
| EP | 2641788 | A1 | 9/2013 |
| JP | 2012035737 | A | 2/2012 |
| JP | 2016147647 | A | 8/2016 |
| JP | 2018502762 | A | 2/2018 |
| JP | 2019503298 | A | 2/2019 |
| JP | 2020504053 | A | 2/2020 |
| JP | 2020525336 | A | 8/2020 |
| JP | 2020536784 | A | 12/2020 |
| JP | 2021514890 | A | 6/2021 |
| WO | 2019107235 | A1 | 6/2019 |

* cited by examiner

ELECTROHYDRAULIC POWER BRAKING SYSTEM

FIELD

The present invention relates to an electrohydraulic power braking system.

BACKGROUND INFORMATION

Electrohydraulic power braking systems generate a hydraulic brake pressure for actuating wheel brakes with power, wherefore, for example, a piston is displaced in a cylinder by means of an electric motor via a screw drive. A muscle-power actuated master brake cylinder for alternative actuation of the power braking system can be provided in particular for the purpose of auxiliary braking, for example, in the event of failure of the electric motor or the power supply of said electric motor.

European Patent Application Nos. EP 1 970 271 A1 and EP 2 641 788 A1 describe such power braking systems with the special feature that the cylinder for power braking is designed like a master brake cylinder of a dual-circuit vehicle braking system as a dual-circuit cylinder for a hydraulically separate connection of two brake circuits. Like a dual-circuit master brake cylinder, the power braking cylinder comprises two pistons arranged coaxially one behind the other and spaced apart in the cylinder, a first piston, also called the primary piston or the rod piston, of which is displaced by an electric motor via a ball screw drive, and a second piston, also called the secondary piston or the floating piston, of which is subjected to the hydraulic brake pressure generated by the first piston, as a result of which the second piston generates the same brake pressure.

SUMMARY

A electrohydraulic power braking system according to an example embodiment of the present invention includes two piston-cylinder units, wherein a first piston in a first cylinder of a first piston-cylinder unit can be displaced by means of an electric motor via a rotation/translation converter gear such as a screw drive in order to generate a hydraulic brake pressure with power. A second cylinder of a second piston-cylinder unit communicates with the first cylinder in such a way that a face or piston surface, herein referred to as the rear face, of a second piston in the second cylinder is subjected to the hydraulic brake pressure generated by the first piston in the first cylinder. Under pressure, the second piston generates a hydraulic brake pressure in the second cylinder on a face or piston surface, herein referred to as the front face, facing away from the rear face. The brake pressures can be the same on both faces of the second piston, or there can be a pressure intensification or pressure reduction, for example, by means of a diametrically stepped second piston in the second cylinder, which in this case is also diametrically stepped.

Like conventional dual-circuit master brake cylinders, the two piston-cylinder units of the power braking system according to the present invention allow two brake circuits to be hydraulically separated.

Further developments and advantageous embodiments of the present invention are disclosed herein.

An example embodiment of the present invention provides a check valve connecting the first cylinder or the second cylinder and a brake circuit connected to the cylinder to a brake fluid reservoir. There may be such a check valve in one or both brake circuits. Throughflow is possible from the direction of the brake fluid reservoir in the direction of the cylinder and the brake circuit and enables brake fluid to be sucked from the brake fluid reservoir into the cylinder or into the brake circuit. If, for example, the piston jams in the cylinder, brake fluid can flow from the brake fluid reservoir through the check valve, past the cylinder and into the brake circuit. The check valve increases the availability of the power braking system.

In order to increase the availability of the power braking system according to an example embodiment of the present invention, a power brake pressure generator is provided with which a hydraulic brake pressure can be generated independently and alternatively to the two piston-cylinder units. The power brake pressure generator may be, for example, a hydraulic pump of a slip control system of the power braking system. In this embodiment, the power braking system according to the present invention is also suitable for autonomous driving.

According to an example embodiment of the present invention, it is possible to design the power braking system without a master brake cylinder that can be actuated by muscle power.

All features disclosed in the description and figures can be implemented individually or in fundamentally any combination in embodiments of the present invention. Embodiments of the present invention which do not comprise all but only one or more features of an embodiment of the present invention are possible in principle.

BRIEF DESCRIPTION OF THE DRAWINGS

The present invention is explained in more detail in the following with reference to the example embodiments shown in the figures.

DETAILED DESCRIPTION OF EXAMPLE EMBODIMENTS

Figure 1:
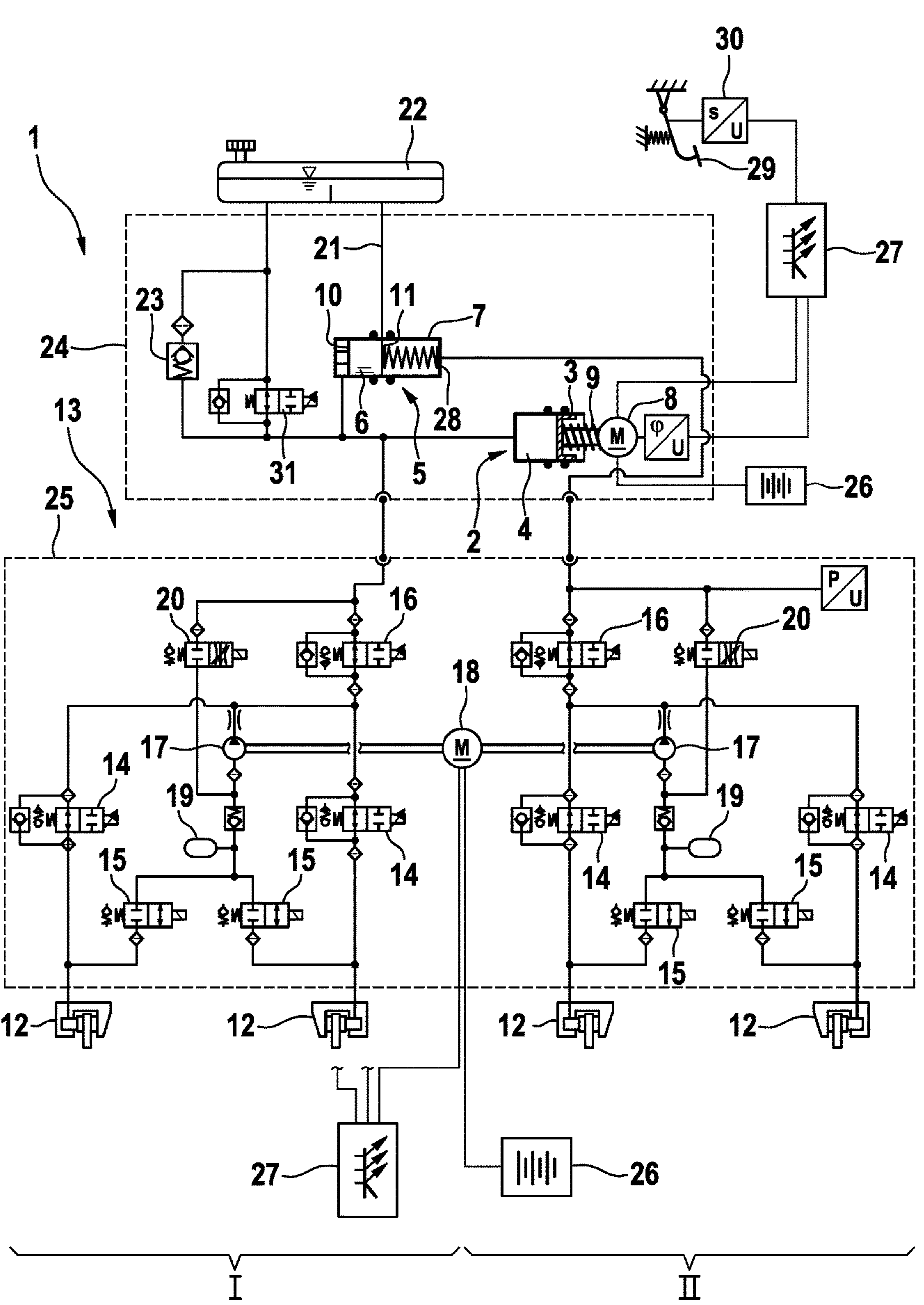
FIGS. 1 and 2 each show a hydraulic circuit diagram of a electrohydraulic power braking system according to an example embodiment of the present invention.

The electrohydraulic power braking system 1 shown in FIG. 1 comprises a first piston-cylinder unit 2 with a first piston 3 which can be displaced in a first cylinder 4, and a second piston-cylinder unit 5 with a second piston 6 which can be displaced in a second cylinder 7. Preferably, the first piston 3 comprises a larger diameter than the second piston 6.

In order to generate a hydraulic brake pressure with power, the first piston 3 can be displaced in the second cylinder 4 by means of a first electric motor 8 via a worm gear 9, in particular a ball screw drive. The worm gear 9 can be generally understood as a rotation/translation converter gear. A reduction gear, in particular a planetary gear, which is not shown, can be arranged between the first electric motor 8 and the worm gear 9. According to the present invention, the first electric motor 8, the worm gear 9 and, if present, the reduction gear are arranged coaxially to the first piston-cylinder unit 2, i.e., coaxially to the first cylinder 4 and the first piston 3, whereby the present invention does not fundamentally exclude other arrangements of the first electric motor 8, the worm gear 9 and, if applicable, the reduction gear in relation to the first piston-cylinder unit 2, the first cylinder 4 and the first piston 3.

The second cylinder 7 communicates with the first cylinder 4 in such a way that an end face or piston surface of the second piston 6, herein referred to as the rear face 10, is subjected to the hydraulic brake pressure generated in the first cylinder 4 or to the hydraulic brake pressure prevailing in the first cylinder 4. By applying the hydraulic brake pressure from the first cylinder 4 to its rear face 10, the second piston 6 generates a hydraulic brake pressure in the second cylinder 7 on its front face 11 facing away from the rear face 10, which in the exemplary embodiment is the same as the hydraulic brake pressure on the rear face 10. Embodiments with a pressure intensification or a pressure reduction, for example by means of a diametrically stepped second piston 6 in an equally diametrically stepped second cylinder 7, are possible (not shown).

The power braking system 1 according to the present invention is designed as a dual-circuit braking system with two brake circuits I, II and—in the exemplary embodiment—four hydraulic wheel brakes 12, of which two are respectively connected to one brake circuit I, II. A first of the two brake circuits I is connected to the first cylinder 4 in such a way that it is subjected to the hydraulic brake pressure generated by the first piston 3 during its displacement in the first cylinder 4. Through its connection to the second cylinder 7, the first brake circuit I is concurrently connected to the second cylinder 7 on the rear face 10 of the second piston 6.

The second brake circuit II is connected to the second cylinder 7 on the front face 11 of the second piston 6 and is subjected to the hydraulic brake pressure generated or prevailing in said second cylinder 7, which in the embodiment of the present invention is the same as the brake pressure in the first cylinder 4, but in embodiments of the present invention may be greater or smaller.

The power braking system 1 comprises a slip control system 13 with an inlet valve 14 and an outlet valve 15 for each wheel brake 12. The wheel brakes 12 are connected to the cylinders 4, 7 of the two piston-cylinder units 2, 5 through the inlet valves 12, a separator valve 16 being arranged in each brake circuit I, II between the respective cylinder 4, 7 and the inlet valves 14.

Through the outlet valves 15, the wheel brakes 12 in each brake circuit I, II are connected to a suction side of a hydraulic pump 17, wherein the two hydraulic pumps 17 of the two brake circuits I, II can be actuated by means of a common second electric motor 18. The hydraulic pumps 17 with the second electric motor 18 form a power brake pressure generator. Pressure sides of the hydraulic pumps 17, which are part of the slip control system 13, are connected between the separator valves 16 and the inlet valves 14. A hydraulic accumulator 19 is provided on each of the suction sides of the hydraulic pumps 17 for intermediate storage of brake fluid from the wheel brakes 12 during slip control. Furthermore, the suction sides of the hydraulic pumps 19 are connected to the two cylinders 4, 7 by suction valves 20.

The inlet valves 14, outlet valves 15, separator valves 16, suction valves 20, and connection valve 31 are 2/2-way solenoid valves, the inlet valves 14, separator valves 16, and connection valve 31 being open in their currentless home positions and the outlet valves 15 and suction valves 20 being closed in their currentless home positions. The slip control system 13 enables brake pressure in the wheel brakes 12 to be controlled individually for each wheel. In particular, slip control systems such as anti-lock control, traction control and vehicle dynamics control are possible, for which the abbreviations ABS, ASR and FDR are commonly used. Such slip control systems are conventional and will not be explained in more detail here.

Redundancy is ensured by the hydraulic pumps 17 of the slip control system 13, which can be actuated by the second electric motor 18 and form the power brake pressure generator, i.e., a hydraulic brake pressure can be generated alternatively to being generated with the two piston-cylinder units 2, 5 by actuating the hydraulic pumps 17 of the slip control system 13, which ensures availability of the power braking system 1 according to the present invention even in the event of a failure of the first electric motor 8, making the power braking system 1 also suitable for autonomous driving.

The cylinders 4, 7 of the two piston-cylinder units 2, 5 are connected to a brake fluid reservoir 22 by brake lines 21, the openings into the cylinders 4, 7 of which pass over the pistons 3, 6 when they are displaced from a home position to generate the brake pressure in such a way that the pistons 3, 6 hydraulically separate the cylinders 4, 7 from the brake fluid reservoir 22 when they begin to be displaced, as is conventional in muscle-power actuated master brake cylinders.

One of the two brake circuits I is connected to the brake fluid reservoir 22 by a check valve 23, which is arranged between the brake fluid reservoir 22 on the one hand and the separator valve 16 and the suction valve 20 on the other hand and through which flow can pass in the direction from the brake fluid reservoir 22 to the brake circuit I. This also allows the hydraulic pump 17 of the slip control system 13 in this brake circuit I to suck brake fluid from the brake fluid reservoir 22 past the cylinders 4, 7 when the suction valves 20 are opened. This enables the brake pressure to be generated even if, for example, the pistons 3, 6 of the piston-cylinder unit 2, 5 are stuck or otherwise blocked in the cylinders 4, 7 in an advanced position in which they hydraulically separate the brake fluid reservoir 22 from the cylinders 4, 7.

The other brake circuit II is connected directly to the brake fluid reservoir 22 without an intermediate valve, so that brake pressure can also be built up in this brake circuit II using the hydraulic pump 17.

Hydraulically parallel to the check valve 23 is a connection valve 31 through which brake fluid can be both sucked in from the brake fluid reservoir 22 and displaced into the brake fluid reservoir 22 by the two piston-cylinder units 2, 5 and the hydraulic pump 17 of the one brake circuit I.

Through the check valve 23, the pistons 3, 6 of the two piston-cylinder units 2, 5 are also connected to the brake fluid reservoir 22, whereby the pistons 3, 6 can suck brake fluid from the brake fluid reservoir 22 into the cylinders 4, 7 during a return stroke. Embodiments of the power braking system 1 without the check valve 23 and/or without the connection valve 31 are possible (not shown).

Figure 2:
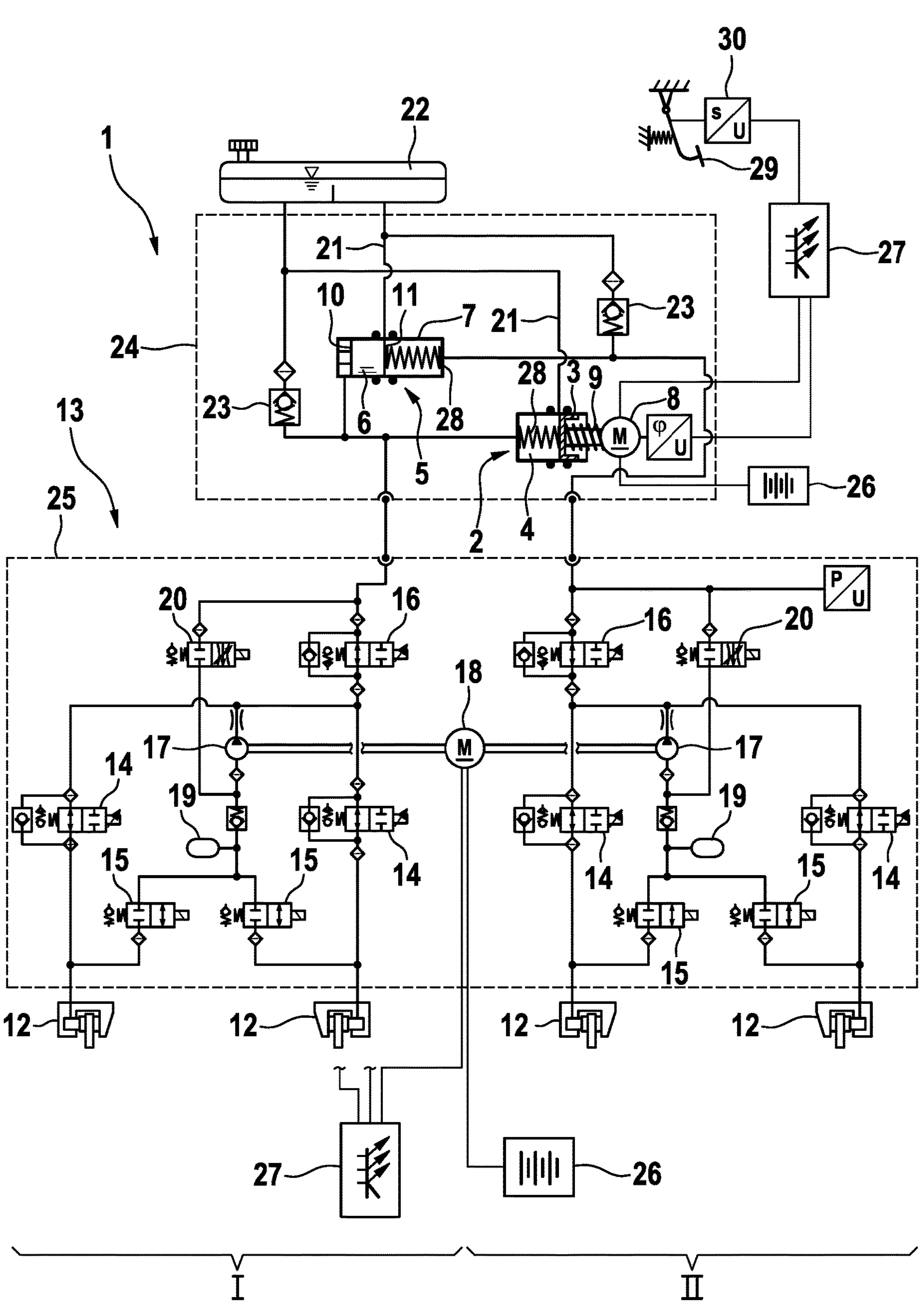

In contrast to FIG. 1, the power braking system 1 according to the present invention in FIG. 2 comprises a check valve 23 in each brake circuit I, II, which connect the cylinders 4, 7 of the piston-cylinder units 2, 5 to the brake fluid reservoir 22 and through which the hydraulic pumps 17 of the slip control system 13 can suck brake fluid from the brake fluid reservoir 22. A connection valve is missing in FIG. 2, although the present invention does not exclude a connection valve in this embodiment of the present invention. In other respects, the power braking systems 1 are designed in the same way in both figures, and the explanations of FIG. 1 are referenced for the explanation of FIG. 2.

In the exemplary embodiment of the present invention, the power braking system 1 is designed in a modular fashion, with the two piston-cylinder units 2, 5 being accommodated in one module, referred to here as pressure generating module 24, and the slip control system in another module, referred to here as pressure regulating module 25. For example, the two piston-cylinder units 2, 5 can also each be accommodated in a separate module (not shown), or the piston-cylinder units 2, 5 and the slip control system 13 can be accommodated in a common module (not shown).

For reasons of redundancy, the pressure generating module 24 and the pressure regulating module 25 each comprise their own electrical power supply 26 and their own electronic control unit 27, which ensures the availability of the power braking system 1 in the event of an error in the pressure generating module 24 or in the pressure regulating module 25 or the slip control system 13.

In FIG. 1, a piston return spring 28 is arranged in the second cylinder 7, which presses the second piston 6 into its home position. In the first cylinder 4, a piston return spring can be omitted if the first piston 3 is connected in a tension-resistant manner to the worm gear 9, which can also be generally understood as a rotation/translation converter gear, in such a way that the first piston 3 can be displaced not only to generate the brake pressure but also in an opposite direction by means of the first electric motor 8 via the worm gear 9.

In FIG. 2, a piston return spring 28 is provided in both cylinders 4, 7, wherein the piston return spring 28 in the first cylinder 4 can also be omitted here if the first piston 3 is connected to the worm gear 9 in a tension-resistant manner.

As a setpoint generator for the brake pressure to be generated with the piston-cylinder units 2, 5, the power braking system 1 features a spring-loaded foot brake pedal 29 with a displacement sensor 30 or optionally a force sensor. For redundancy, a plurality of displacement sensors or force sensors or one displacement sensor and one force sensor can also be provided (not shown). In principle, it is possible to provide a single-circuit master brake cylinder which can be actuated by muscle power and with which one of the two brake circuits I, II can be pressurized with a hydraulic brake pressure as an alternative to generating pressure by means of the piston-cylinder units 2, 5, or a dual-circuit master brake cylinder with which both brake circuits I, II can be pressurized (not shown). With such a master brake cylinder, the power braking system 1 can be actuated with muscle power, in particular in the event of failure of the first piston-cylinder unit 2 and the hydraulic pumps 17 of the slip control system 13. In the illustrated embodiment, the power braking system 1 does not comprise a master brake cylinder and cannot be actuated by muscle power. Due to the possibility of generating the brake pressure either with the first piston-cylinder unit 2 or the hydraulic pumps 17, the power braking system 1 can nevertheless also be used for autonomous driving, in which the power braking system 1 must be able to be actuated autonomously even without actuation by a vehicle driver.

The invention claimed is:

1. An electrohydraulic power braking system, comprising:

a first piston-cylinder unit including a first piston which, to generate a hydraulic brake pressure with power, can be displaced using a first electric motor via a rotation/translation converter gear in a first cylinder of the first piston-cylinder unit; and a second piston-cylinder unit including a second piston and a second cylinder, the second cylinder communicating with the first cylinder of the first piston-cylinder unit in such a way that the hydraulic brake pressure of the first cylinder exerts pressure on a rear face of the second piston in the second cylinder of the second piston-cylinder unit in such a way that the second piston generates a hydraulic brake pressure in the second cylinder of the second piston-cylinder unit on a front face facing away from its rear face, wherein the first piston of the first piston-cylinder unit has a larger diameter than the second piston of the second piston-cylinder unit.

2. The electrohydraulic power braking system according to claim 1, wherein the power braking system includes a first brake circuit connected to the first cylinder of the first piston-cylinder unit or on the rear face of the second piston to the second cylinder, and a second braking circuit connected on the front face of the second piston to the second cylinder of the second piston-cylinder unit.

3. The electrohydraulic power braking system according to claim 1, wherein the first electric motor and the rotation/translation converter gear are arranged coaxially with the first cylinder of the first piston-cylinder unit.

4. The electrohydraulic power braking system according to claim 1, further comprising:

a power brake pressure generator with which a hydraulic brake pressure can be generated as an alternative to generating brake pressure with the first and second piston-cylinder units.

5. The electrohydraulic power braking system according to claim 4, wherein the power braking system comprises a slip control system including the power brake pressure generator.

6. The electrohydraulic power braking system according to claim 4, wherein the power braking system comprises a redundant power supply and/or a redundant electronic controller for the first electric motor of the first piston-cylinder unit and the power brake pressure generator or a slip control system.

7. The electrohydraulic power braking system according to claim 1, wherein the first piston of the first piston-cylinder unit is connected in a tension-resistant and pressure-resistant manner to the rotation/translation converter gear in such a way that the first piston can be displaced using the first electric motor via the rotation/translation converter gear in two opposite directions in the second cylinder of the second piston-cylinder unit.

8. An electrohydraulic power braking system, comprising:

a first piston-cylinder unit including a first piston which, to generate a hydraulic brake pressure with power, can be displaced using a first electric motor via a rotation/translation converter gear in a first cylinder of the first piston-cylinder unit;

a second piston-cylinder unit including a second piston and a second cylinder, the second cylinder communicating with the first cylinder of the first piston-cylinder unit in such a way that the hydraulic brake pressure of the first cylinder exerts pressure on a rear face of the second piston in the second cylinder of the second piston-cylinder unit in such a way that the second piston generates a hydraulic brake pressure in the second cylinder of the second piston-cylinder unit on a front face facing away from its rear face;

a first brake circuit connected to the first cylinder of the first piston-cylinder unit or on the rear face of the second piston to the second cylinder;

a second braking circuit connected on the front face of the second piston to the second cylinder of the second piston-cylinder unit;

a brake fluid reservoir; and a check valve which connects the first cylinder of the first piston-cylinder unit or the second cylinder of the second piston-cylinder unit and the first brake circuit or the second brake circuit to the brake fluid reservoir and which allows throughflow in a direction of the first cylinder or second cylinder and in a direction of the first brake circuit or the second brake circuit.

9. The electrohydraulic power braking system according to claim 8, further comprising:

a connection valve through which the first cylinder of the first piston-cylinder unit and/or the second cylinder of the second piston-cylinder unit is connected to the brake fluid reservoir.

10. An electrohydraulic power braking system, comprising:

a first piston-cylinder unit including a first piston which, to generate a hydraulic brake pressure with power, can be displaced using a first electric motor via a rotation/translation converter gear in a first cylinder of the first piston-cylinder unit; and a second piston-cylinder unit including a second piston and a second cylinder, the second cylinder communicating with the first cylinder of the first piston-cylinder unit in such a way that the hydraulic brake pressure of the first cylinder exerts pressure on a rear face of the second piston in the second cylinder of the second piston-cylinder unit in such a way that the second piston generates a hydraulic brake pressure in the second cylinder of the second piston-cylinder unit on a front face facing away from its rear face, wherein the power braking system comprises no actuation by muscle power.

* * * * *